(12) United States Patent
Choi et al.

(10) Patent No.: US 9,609,183 B2
(45) Date of Patent: Mar. 28, 2017

(54) CAMERA MODULE AND ELECTRONIC DEVICE INCLUDING THE SAME

(71) Applicant: SAMSUNG ELECTRO-MECHANICS CO., LTD., Suwon-Si (KR)

(72) Inventors: Kang Ryong Choi, Suwon-Si (KR); Hyung Jin Jeon, Suwon-Si (KR); Jeong Gu Yeo, Suwon-Si (KR); Kang Heon Hur, Suwon-Si (KR); Sung Yong An, Suwon-Si (KR); Jung Wook Seo, Suwon-Si (KR)

(73) Assignee: SAMSUNG ELECTRO-MECHANICS CO., LTD., Suwon-si, Gyeonggi-do (KR)

( * ) Notice: Subject to any disclaimer, the term of this patent is extended or adjusted under 35 U.S.C. 154(b) by 133 days.

(21) Appl. No.: 14/463,438

(22) Filed: Aug. 19, 2014

(65) Prior Publication Data

US 2015/0055009 A1 Feb. 26, 2015

(30) Foreign Application Priority Data

Aug. 20, 2013 (KR) .................. 10-2013-0098750
Mar. 13, 2014 (KR) .................. 10-2014-0029681

(51) Int. Cl.
*H04N 5/225* (2006.01)

(52) U.S. Cl.
CPC ......... *H04N 5/2252* (2013.01); *H04N 5/2253* (2013.01); *H04N 5/2254* (2013.01); *H04N 5/2257* (2013.01)

(58) Field of Classification Search
CPC .. H04N 5/2252; H04N 5/2257; H04N 5/2254; H04N 5/2253; G02B 13/001–13/009; H04M 2250/20–2250/52; H04M 1/0264
See application file for complete search history.

(56) References Cited

U.S. PATENT DOCUMENTS

| | | | |
|---|---|---|---|
| 6,195,053 B1* | 2/2001 | Kodukula | G06K 7/0004 235/462.47 |
| 6,975,273 B1* | 12/2005 | Choi | H04N 5/2259 343/702 |
| 2005/0128322 A1* | 6/2005 | Eaton | H04N 5/2254 348/239 |
| 2005/0212069 A1* | 9/2005 | Sato | H04N 5/2257 257/432 |
| 2006/0019696 A1* | 1/2006 | Brunel | H04N 7/142 455/550.1 |
| 2006/0056828 A1* | 3/2006 | Iddan | A61B 1/041 396/14 |

(Continued)

FOREIGN PATENT DOCUMENTS

| | | |
|---|---|---|
| JP | 2012-119830 A | 6/2012 |
| KR | 4687832 B2 | 2/2011 |
| KR | 10-2013-0032545 A | 4/2013 |

*Primary Examiner* — Jason Flohre
(74) *Attorney, Agent, or Firm* — McDermott Will & Emery LLP

(57) ABSTRACT

There is provided a camera module including: a lens housing in which a lens is disposed; a glass cover formed of a transparent material and covering the lens housing; and a coil conductive part formed between an outer surface of the lens and an inner surface of the glass cover.

19 Claims, 14 Drawing Sheets

(56) References Cited

U.S. PATENT DOCUMENTS

| | | | |
|---|---|---|---|
| 2006/0114496 A1* | 6/2006 | Cho | H04M 1/72577 |
| | | | 358/1.15 |
| 2008/0180215 A1* | 7/2008 | Mott | G06K 7/0004 |
| | | | 340/10.1 |
| 2009/0153729 A1* | 6/2009 | Hiltunen | H04N 5/2251 |
| | | | 348/371 |
| 2010/0110283 A1* | 5/2010 | Shin | H04N 5/2251 |
| | | | 348/374 |
| 2012/0262357 A1* | 10/2012 | Kato | H01Q 1/38 |
| | | | 343/788 |
| 2012/0293668 A1* | 11/2012 | Huang | H04N 5/2257 |
| | | | 348/207.1 |
| 2013/0079069 A1 | 3/2013 | Kwon | |
| 2013/0184032 A1* | 7/2013 | Choi | H04M 1/0264 |
| | | | 455/556.1 |
| 2013/0207851 A1* | 8/2013 | Dabov | H01Q 7/00 |
| | | | 343/702 |
| 2014/0087658 A1* | 3/2014 | Hou | G06F 3/041 |
| | | | 455/41.1 |

* cited by examiner

CAMERA MODULE AND ELECTRONIC DEVICE INCLUDING THE SAME

CROSS-REFERENCE TO RELATED APPLICATION

This application claims the benefit of Korean Patent Application No. 10-2013-0098750 filed on Aug. 20, 2013, and 10-2014-0029681 filed on Mar. 13, 2014, with the Korean Intellectual Property Office, the disclosures of which are incorporated in their entireties herein by reference.

BACKGROUND

The present disclosure relates to a camera module and an electronic device including the same.

Recently, radio-frequency identification (RFID) systems, such as a near field communications (NFC) system, have been used in electronic devices such as mobile phones, smartphones, tablet personal computers (PC), laptop computers, and the like.

Such RFID systems are examples of antenna systems for transmitting and receiving signals, and such an antenna systems are implemented by modules including coil conductors.

When an antenna system is used in a metal case, magnetic flux passing through a metal surface may induces an eddy current within the metal of the case, such that a magnetic repulsion field according to Lenz's law may be generated. A recognition distance of the antenna system for communications is decreased by the repulsion field.

In Patent Document 1, a conductive layer includes an opening part and a slit part formed between the opening part and an edge of the conductive layer. When current flows in a coil conductor, the current flows around the opening part and is circulated to the edge of the conductive layer through an edge of the slit part.

In Patent Document 1, since the slit part is formed in the conductive layer, there is limited flexibility in a design of the conductive layer, and a separate injection-molding structure covering a slit is required in order to prevent the entry of contaminants such as dust.

RELATED ART DOCUMENT (Patent Document 1) Japanese Patent Publication No. 4687832

SUMMARY

An aspect of the present disclosure may provide a camera module capable of being disposed in a position corresponding to an opening part of a metal conductive cover without expanding the opening part and enabling antenna communications, and an electronic device including the same.

According to an aspect of the present disclosure, a camera module may include: a lens housing in which a lens is disposed; a glass cover formed of a transparent material and covering the lens housing; and a coil conductive part formed between an outer surface of the lens and an inner surface of the glass cover.

The glass cover may have a shielding coating layer formed thereabove in order to prevent the coil conductive part from being exposed externally.

The coil conductive part may be formed on a substrate and wound outside of a non-conductive region of the substrate, the non-conductive region in which a penetration hole is formed in order to expose the lens.

The coil conductive part may be injection-molded and enclosed by the glass cover.

The lens housing may have a seating groove formed in an edge thereof so that the coil conductive part may be seated thereon.

The coil conductive part may be formed on a substrate in which a penetration hole is formed, the penetration hole having a protruding part penetrating therethrough and the protruding part being formed by the seating groove.

The lens housing may include a magnetic material.

The coil conductive part may be formed on an upper surface of the glass cover.

The lens housing may have a shoulder part protruding therefrom in a direction perpendicular with respect to an optical axis direction, and the coil conductive part may be formed on an upper surface or a lower surface of the shoulder part.

The coil conductive part may be wound and formed in an optical axis direction of the lens housing.

The lens housing around which the coil conductive part is wound may include a magnetic material.

The lens housing may include a light source integrated module formed integrally with a light source part.

The coil conductive part may be attached to the light source integrated module.

The coil conductive part may be wound around the light source integrated module in an optical axis direction.

According to another aspect of the present disclosure, a camera module may include: a lens housing including a lens; a camera module case coupled to the lens housing and in which a penetration hole is formed so that the lens is exposed to light; and a coil conductive part formed outside the penetration hole in an upper surface of the camera module case and transmitting or receiving signals.

The camera module may further include a magnetic material sheet formed on the other surface of a flexible substrate, wherein the coil conductive part is formed outside of a substrate hole on one surface of the flexible substrate in which the substrate hole corresponding to the penetration hole is formed.

The lens housing may include a light source integrated module formed integrally with a light source part.

According to another aspect of the present disclosure, an electronic device may include: a frame in which an opening part is formed; and a camera module disposed in the opening part when viewed from a plane and including a coil conductive part transmitting or receiving signals, wherein the camera module is coupled to the opening part so as to block a space of the opening part from being connected to an internal space of the frame.

The coil conductive part may be exposed to the outside of the opening part.

The frame may include a metal.

The camera module may include a light source integrated module formed integrally with a light source part.

BRIEF DESCRIPTION OF DRAWINGS

The above and other aspects, features and advantages of the present disclosure will be more clearly understood from the following detailed description taken in conjunction with the accompanying drawings, in which.

DETAILED DESCRIPTION

Figure 1:
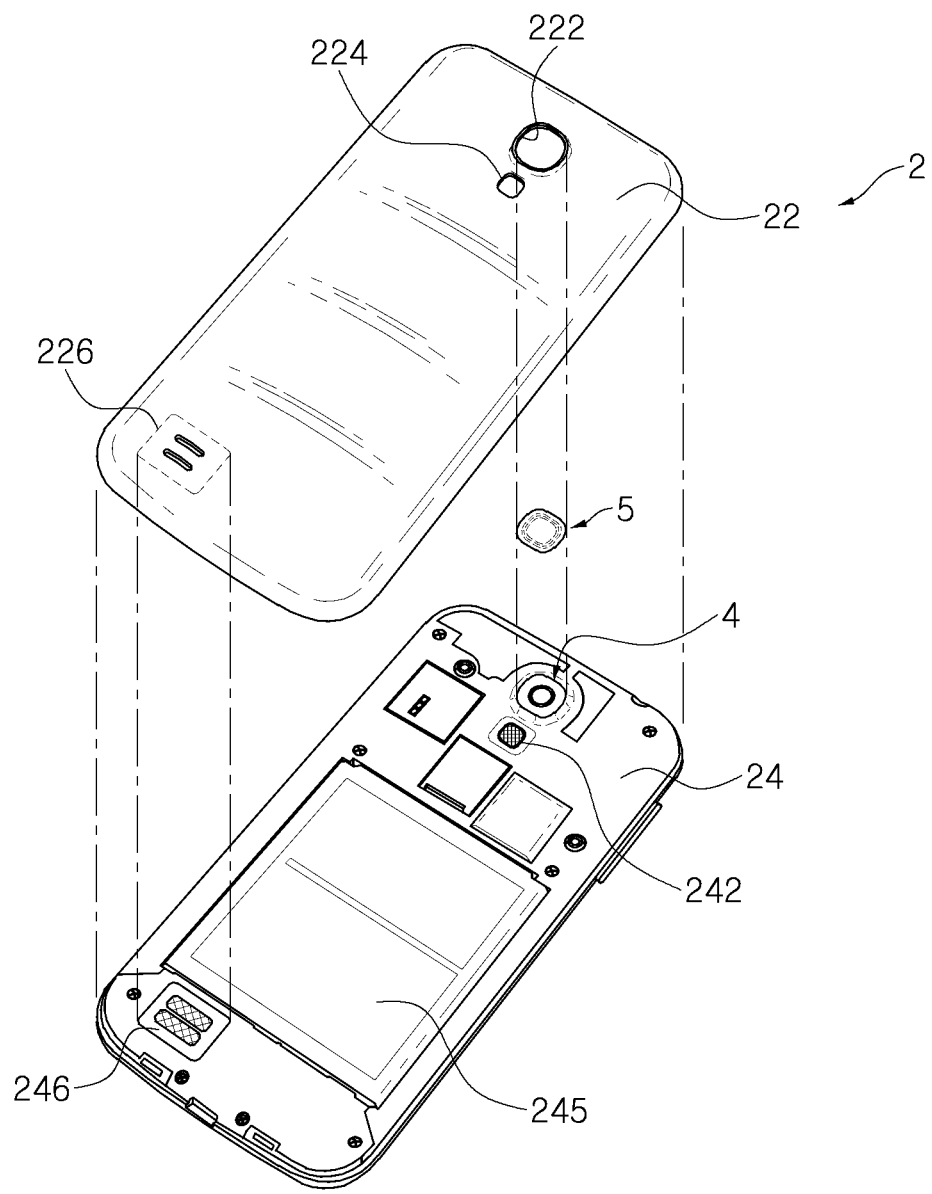
FIG. 1 is an exploded perspective view schematically illustrating an electronic device according to an exemplary embodiment of the present disclosure.

Hereinafter, exemplary embodiments of the present disclosure will be described in detail with reference to the accompanying drawings.

The disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

In the drawings, the shapes and dimensions of elements may be exaggerated for clarity, and the same reference numerals will be used throughout to designate the same or like elements.

Electronic Device

FIG. 1 is an exploded perspective view schematically illustrating an electronic device according to an exemplary embodiment of the present disclosure.

Referring to FIG. 1, an electronic component package 1 according to an exemplary embodiment of the present disclosure may include a frame 2, an antenna module 5, and electronic component modules.

The frame 2 may be a case forming an exterior of the electronic device 1, and the frame 2 according to the present exemplary embodiment may include an external frame 22 formed of a metal. The external frame 22 may be formed by coating a conductor on an outer portion thereof or be formed using a metal.

The frame 2 may further include an internal frame 24 in addition to the external frame 22 formed as a cover.

Electronic component modules such as a battery 245, a camera module 4, a light source part 242, a microphone module 246, and the like, may be mounted in the internal frame 24, and the external frame 22 may be connected to the internal frame 24 in order to protect the electronic component modules. Here, since the camera module 4, the light source part 242, and the microphone module 246 need to be exposed to the outside of the external frame 22, respective opening parts 222, 224, and 226 may be formed in the external frame 22.

In the case in which current flows in the antenna module 5, an eddy current may be generated in the external frame 22 formed of the metal, which may cause a deterioration of communications performance with another wireless electronic apparatus, a near field communications (NFC) device, or the like, with which the electronic device 1 according to the present exemplary embodiment is to communicate.

Here, the antenna module 5 is disposed in a position corresponding to the opening part 222 in the external frame 22, whereby the deterioration of the communications performance due to a metal case may be decreased.

Although the camera module 4 is illustrated as an electronic component module in which the antenna module 5 is formed has been illustrated in FIG. 1, the electronic component module is not limited thereto. That is, a separate antenna module 5 may also be formed in the internal frame 24.

In addition, the antenna module 5 may be formed in the camera module 4, the light source part 242, or the microphone module 246 or be formed in a combined component of the camera module 4 and the light source part 242.

The electronic device 1 according to the present exemplary embodiment may include all of electronic component modules to be described below.

Antenna Module

Figure 2:
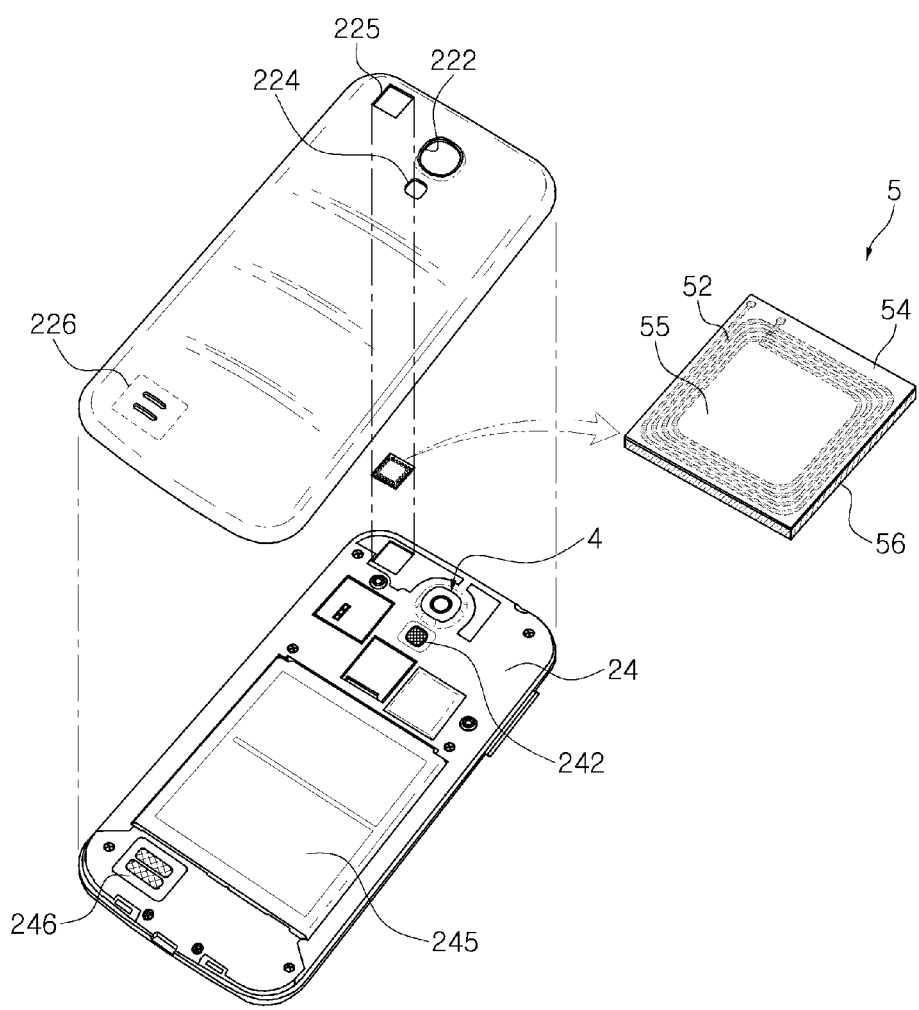
FIG. 2 is a schematic exploded perspective view of the electronic device having an antenna module according to an exemplary embodiment of the present disclosure installed therein.
Figure 3:
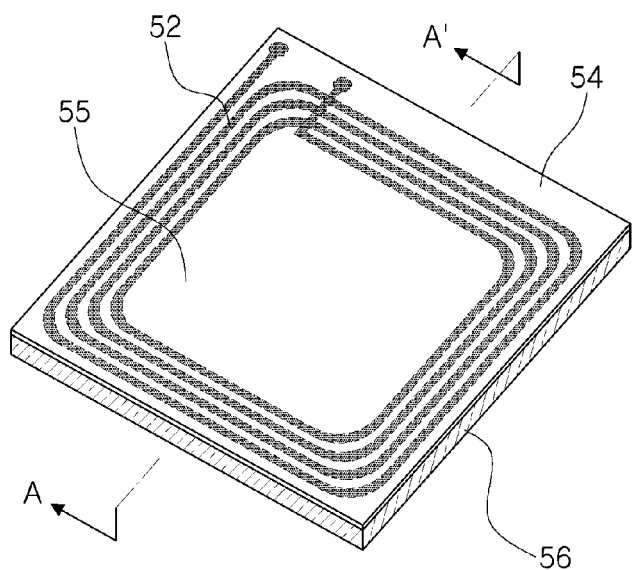
FIG. 3 is a schematic perspective view of the antenna module according to an exemplary embodiment of the present disclosure.

FIG. 2 is a schematic exploded perspective view of the electronic device having an antenna module according to an exemplary embodiment of the present disclosure installed therein; FIG. 3 is a schematic perspective view of the antenna module according to an exemplary embodiment of the present disclosure; and FIG. 4 is a cross-sectional view taken along line A-A' of FIG. 3.

Figure 4:
FIG. 4 is a cross-sectional view taken along line A-A' of FIG. 3.

Referring to FIGS. 2 through 4, an electronic component module according to the present exemplary embodiment may be the antenna module 5 formed by modularizing an antenna conductor.

The antenna module 5 may also be disposed in a position corresponding to a separate opening part 225 in the external frame 22 of the electronic device 1.

The antenna module 5 may include a coil conductive part 52 and a flexible substrate 54 on which the coil conductive part 52 is formed, wherein the flexible substrate 54 on which the coil conductive part 52 is formed may be formed on a module sheet 56.

The coil conductive part 52 may be wound outside of a non-conductive region 55 of the flexible substrate 54.

The antenna module 5 as described above may be disposed in the internal frame 24 depending on a selection by one skilled in the art. In addition, when viewed from a plane, the coil conductive part 52 may be disposed in the opening part 225 of the external frame 22 formed of the metal.

Although the case in which the coil conductive part 52 is formed on the flexible substrate 54 by a method such as a plating method, an etching method, a printing method, or the like, has been illustrated and described in an exemplary embodiment of the present disclosure, a conductive wire formed of copper (Cu), nickel (Ni), iron (Fe), or the like, may also be formed on the module sheet 56.

In addition, the flexible substrate 54 on which the coil conductive part 52 is formed may be injection-molded using a resin or a magnetic material to thereby be formed as a single module.

Meanwhile, in order to use the antenna module 5 as an NFC antenna module for near field communications, the module sheet 56 may be formed of a magnetic material.

The magnetic material may include at least one of Ni—Zn—Cu based ferrite, Mn—Zn based ferrite, and Ni, Fe, Co based amorphous metals.

In addition, the magnetic material may include at least one of chlorinated polyethylene (CPE), polypropylene (PP), ethylene propylene rubber (EPDM), natural rubber (NR), nitrile butadiene rubber (NBR), polyvinyl chloride (PVC), a polyimide based resin, and a polyester based resin. Further, the magnetic material may include at least one of polyethylene (PE), polystyrene (PS), polyethylene terephthalate (PET), polyamide (PA), polyurethane (PU), polycarbonate (PC), polyvinylidene chloride (PVDC), epoxy, and ABS based resin.

Camera Module

Figure 5:
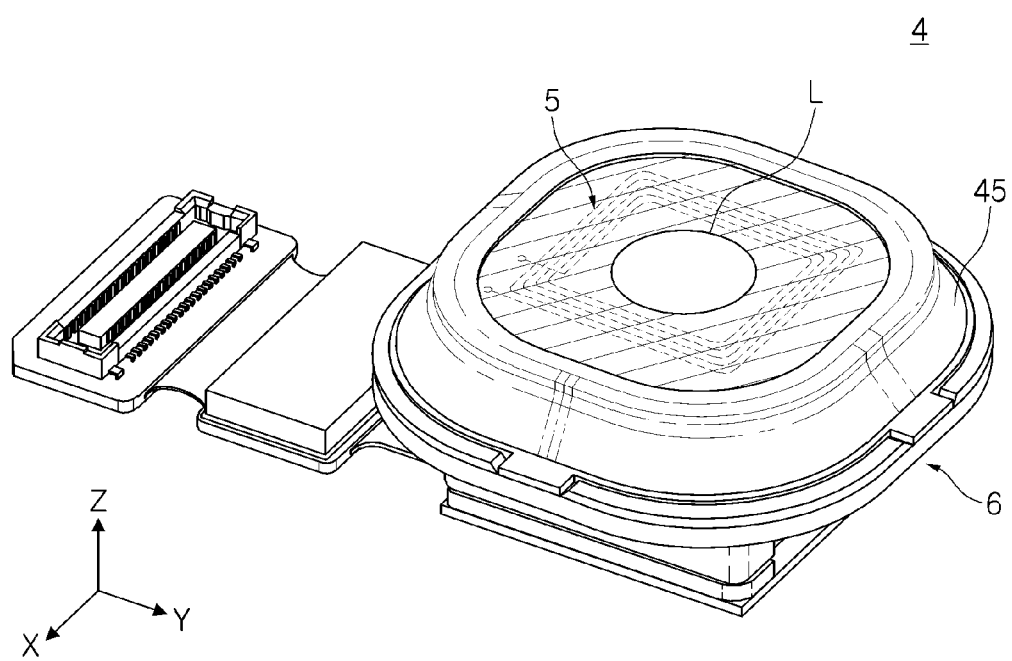
FIG. 5 is a schematic perspective view of a camera module according to a first exemplary embodiment of the present disclosure.
Figure 6:
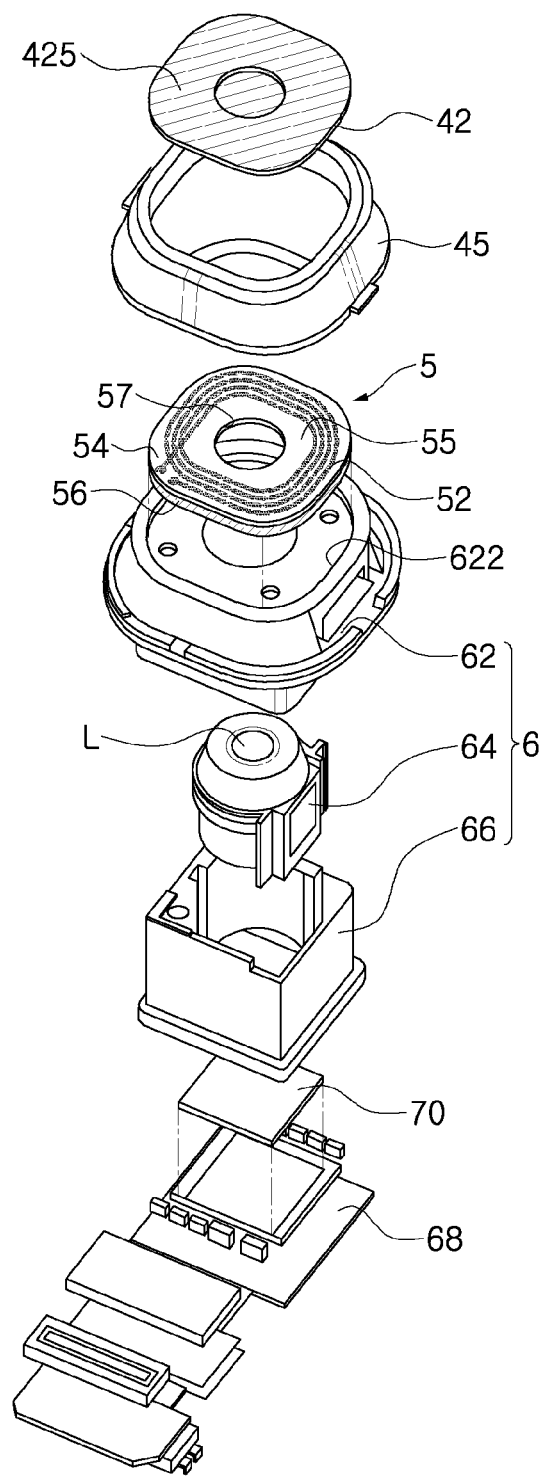
FIG. 6 is a schematic exploded perspective view of the camera module of FIG. 5.

FIG. 5 is a schematic perspective view of a camera module according to a first exemplary embodiment of the present disclosure; and FIG. 6 is a schematic exploded perspective view of the camera module of FIG. 5.

Referring to FIGS. 5 and 6, a camera module 4 according to a first exemplary embodiment of the present disclosure may include a lens housing 6, a glass cover 42, and a coil conductive part 52.

The lens housing 6, an exterior part in which a lens L is arranged in an optical axis direction, may include a lens barrel 64 in which the lens L is fixed, upper and lower housings 62 and 66 in which the lens barrel 64 is accommodated, and a board 68 on which an image sensor 70 is mounted.

The camera module according to the present exemplary embodiment may include the glass cover 42 covering the lens housing.

The glass cover 42 may cover the upper housing 62 in order to protect the lens L from a penetration hole formed in the upper housing 62.

The upper housing 62 may have a seating groove 622 formed therein in order to stably seat the glass cover 42 thereon.

In addition, a protecting cover part 45 may be coupled to the upper housing 62 in order to stably fix the glass cover 42.

The protecting cover part 45 may internally contact an outer surface of the upper housing 62 to prevent external foreign materials from entering into the lens housing 6. The protecting cover part 45 may be omitted if necessary.

The coil conductive part 52 may be formed on the flexible substrate 54 and be used as a component of the antenna module 5 described above. The module sheet 56 formed of the magnetic material may also be formed beneath the flexible substrate 54. When the module sheet 56 formed of the magnetic material is not used, the upper housing 62 may be used as an injection-molded body formed of a magnetic material.

Here, a description for the magnetic material and the antenna module 5 will be replaced by the above-mentioned description. However, the non-conductive region of the antenna module 5 according to the present exemplary embodiment may have a penetration hole 57 formed therein in order to expose the lens L.

When viewed from a plane, the coil conductive part 52 may be formed between an outer surface of the lens L and an inner surface of the glass cover 42, and may transmit or receive signals.

The glass cover 42 may have a shielding coating layer 425 formed thereabove in order to prevent the coil conductive part 52 from being exposed externally, wherein the shielding coating layer 425 has a black color. The center of the shielding coating layer 425 may not be coated with the black color in order to expose the lens L.

Figure 7:
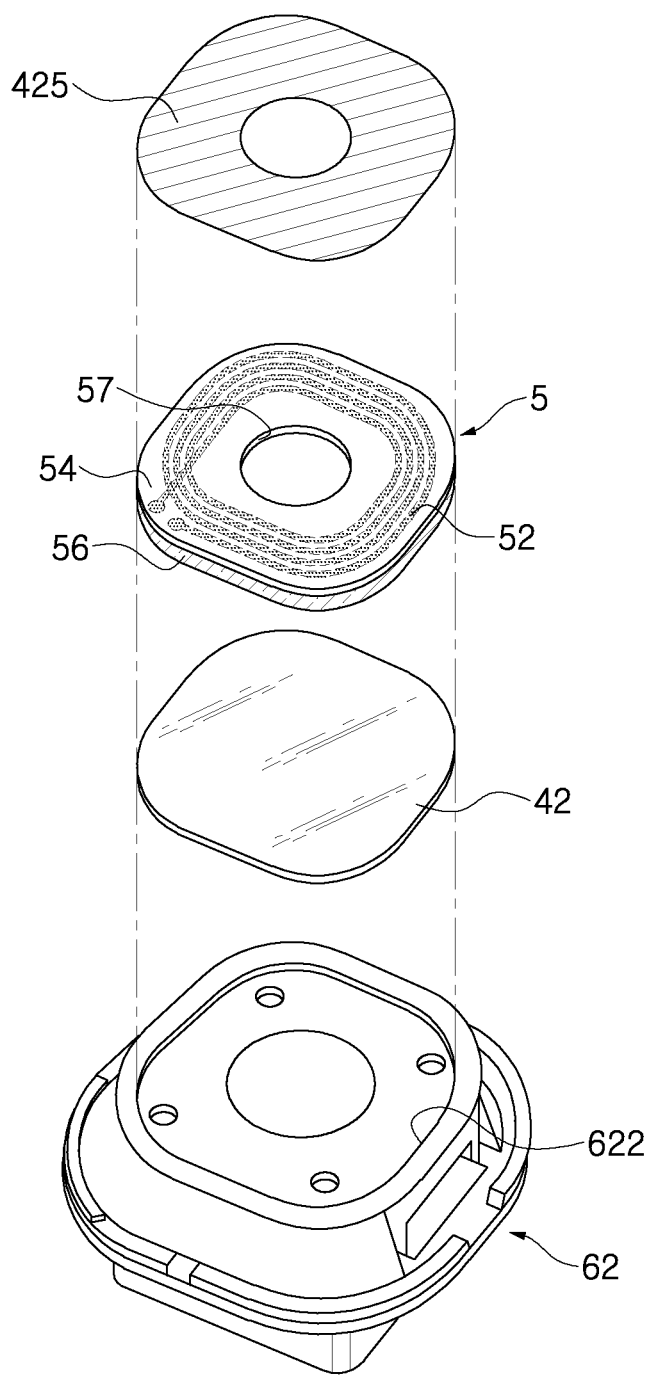
FIG. 7 is a schematic enlarged view of a first modified example of the camera module according to a first exemplary embodiment of the present disclosure.
Figure 8:
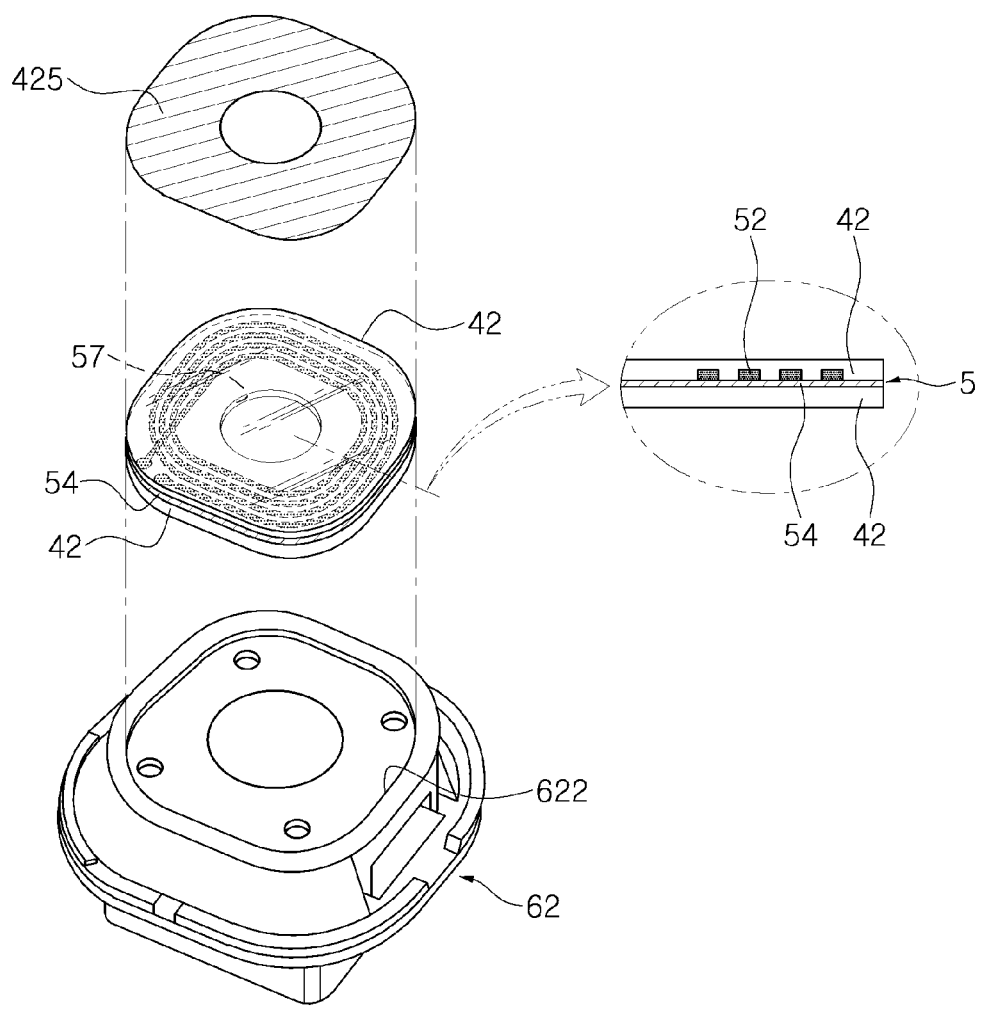
FIG. 8 is a schematic enlarged view of a second modified example of the camera module according to a first exemplary embodiment of the present disclosure.

FIG. 7 is a schematic enlarged view of a first modified example of the camera module according to a first exemplary embodiment of the present disclosure; FIG. 8 is a schematic enlarged view of a second modified example of the camera module according to a first exemplary embodiment of the present disclosure; and FIG. 9 is a schematic enlarged view of a third modified example of the camera module according to a first exemplary embodiment of the present disclosure.

Referring to FIG. 7, the antenna module 5 including the coil conductive part 52 may be formed above the glass cover 42. In this case, the shielding coating layer 425 may be formed above the antenna module 5 in order to prevent the coil conductive part 52 from being exposed.

Referring to FIG. 8, the coil conductive part 52 may be injection-molded and enclosed by the glass covers 42. The coil conductive part 52 may be formed integrally with the glass windows 42, and may be enclosed between the glass windows 42 or be formed on surfaces of the glass windows 42.

Figure 9:
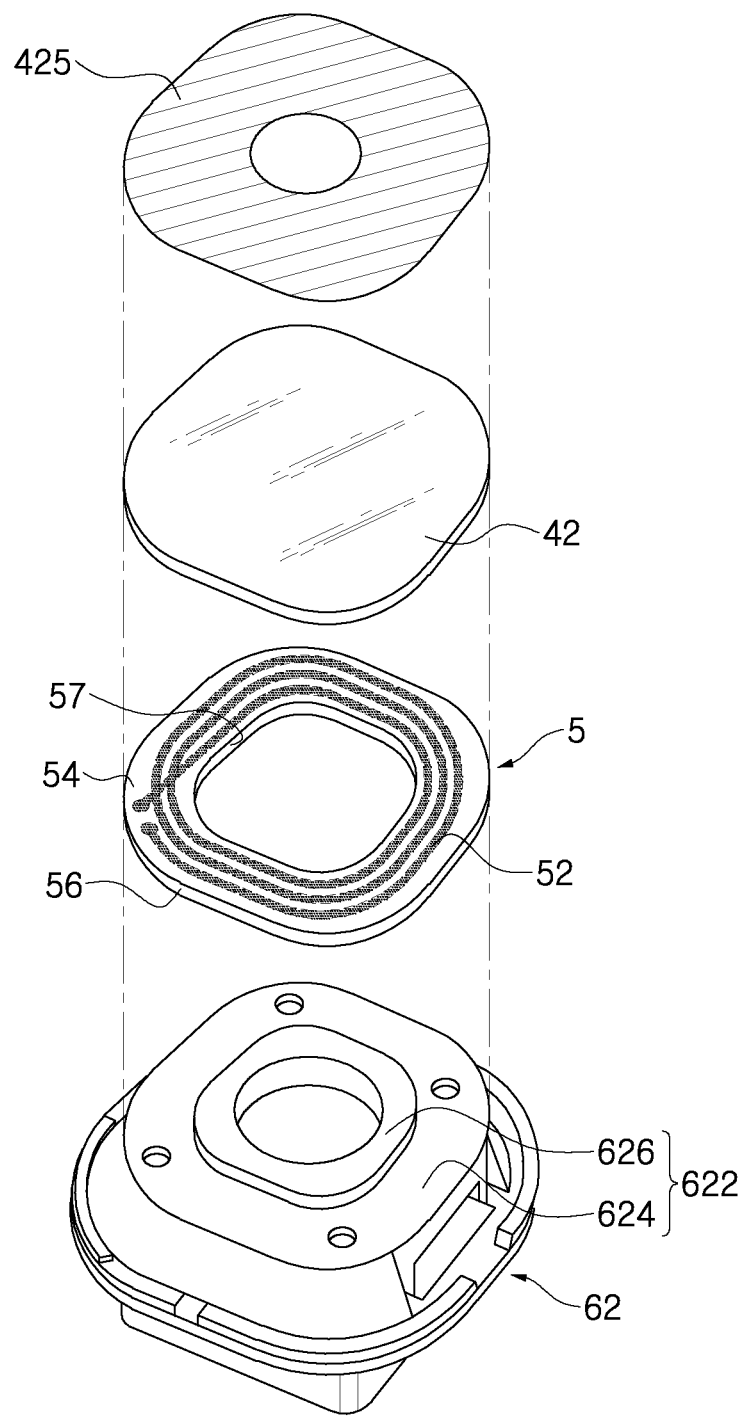
FIG. 9 is a schematic enlarged view of a third modified example of the camera module according to a first exemplary embodiment of the present disclosure.

Referring to FIG. 9, the upper housing 62 may have a seating groove 624 formed in an edge thereof so that the coil conductive part 52 is seated thereon, and the coil conductive part 52 may be formed on the flexible substrate 54 in which a penetration hole 57 is formed, the penetration hole 57 having a protruding part 626 penetrating therethrough and the protruding part 626 being formed by the seating groove 624.

In this case, in order to seat the glass cover 42, a height of the protruding part 626 and a height of the antenna module 5 may be substantially the same.

Here, the upper housing 62 may be an injection-molded body injection-molded using a magnetic material, and the coil conductive part 52 and a metal conductive wire, may be wound around the upper housing 62.

The shielding coating layer 425 may be disposed below the glass cover 42 in order to prevent the shielding coating layer 425 from being stripped due to an external contact.

Figure 10:
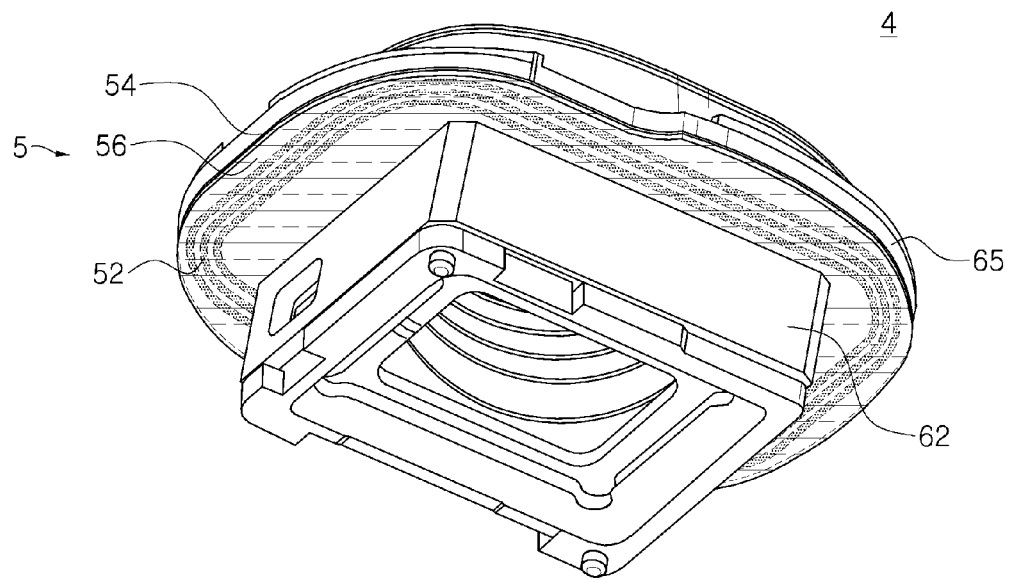
FIG. 10 is a schematic perspective view of a camera module according to a second exemplary embodiment of the present disclosure.
Figure 11:
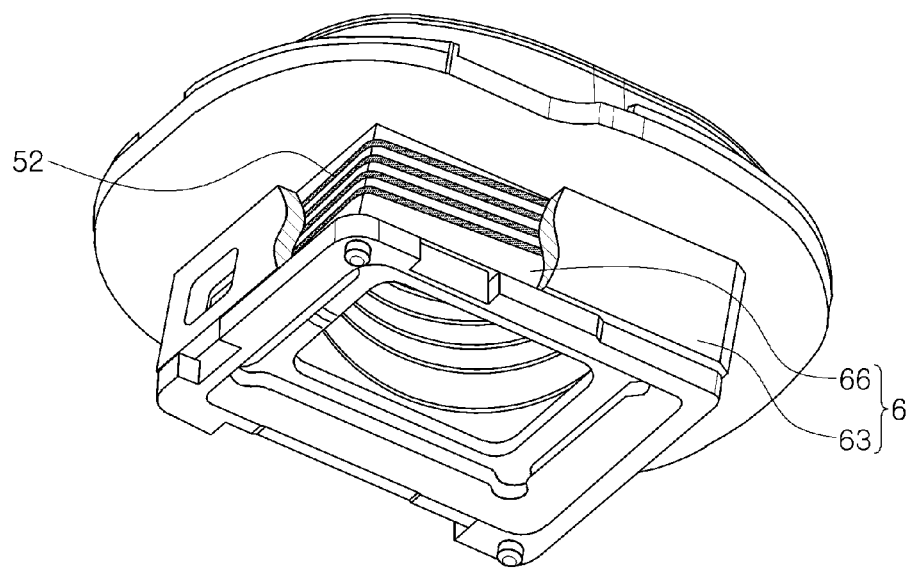
FIG. 11 is a schematic perspective view of a camera module according to a third exemplary embodiment of the present disclosure.

FIG. 10 is a schematic perspective view of a camera module according to a second exemplary embodiment of the present disclosure; and FIG. 11 is a schematic perspective view of a camera module according to a third exemplary embodiment of the present disclosure.

Referring to FIG. 10, the upper housing 62 according to the present exemplary embodiment may have a shoulder part 65 protruding therefrom in a direction perpendicular with respect to the optical axis direction. The shoulder part 65 may have the coil conductive part 52 formed on an upper surface or a lower surface thereof. Since the coil conductive part 52 may have a conductive pattern having a relatively long length, the coil conductive part 52 may serve as an antenna receiving a wide band signal.

Referring to FIG. 11, the coil conductive part 52 may be wound and formed in the optical axis direction of the lens housing 6. The coil conductive part 52 may have a structure of a conductive pattern formed on the flexible substrate 54, and may be formed by winding a conductive wire around the lens housing 6 in the optical axis direction as illustrated in FIG. 11.

The lens housing 6 around which the coil conductive part 52 is wound may include a magnetic material to implement an NFC module appropriate for near field communications.

Figure 12:
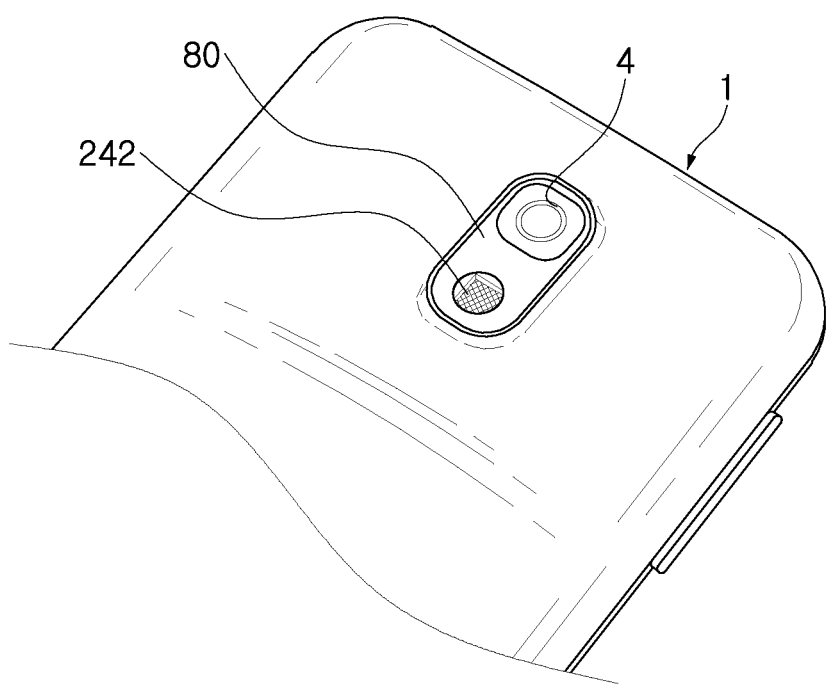
FIG. 12 is a schematic perspective view of a light source integrated camera module according to a fourth exemplary embodiment of the present disclosure.
Figure 13:
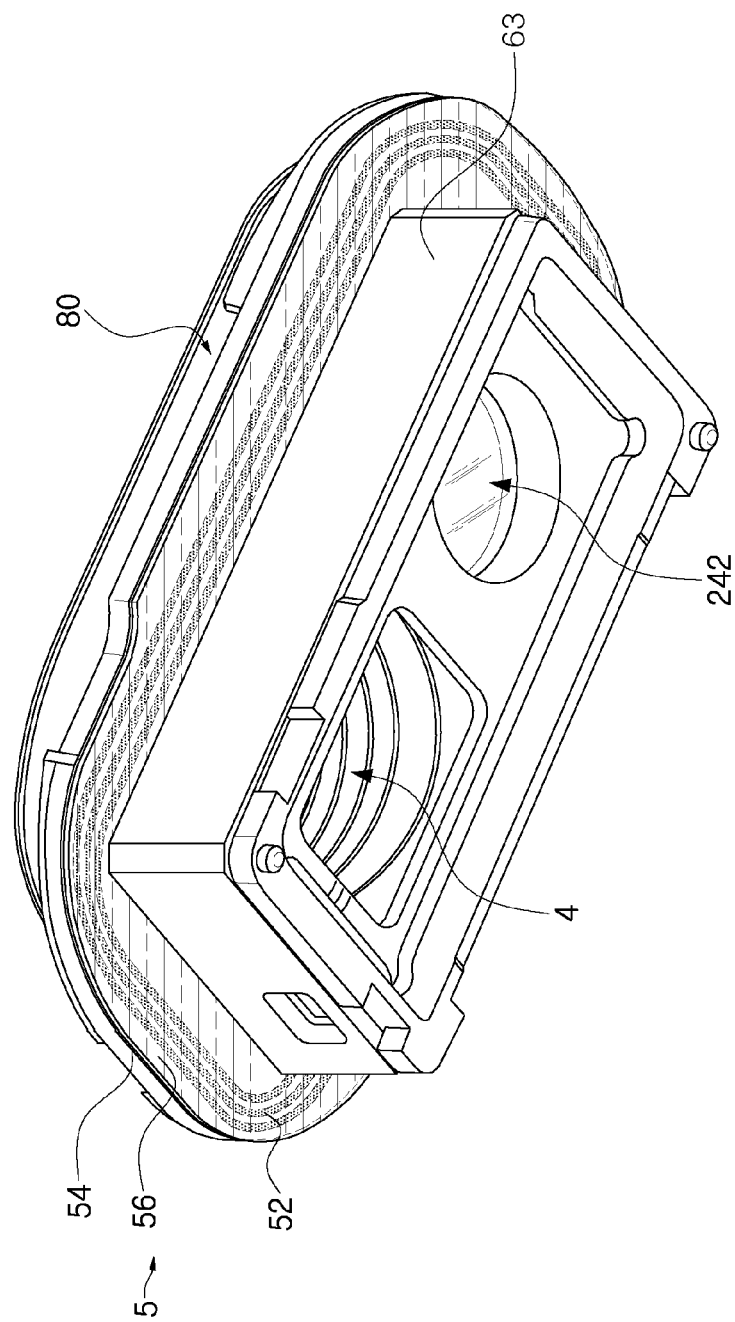
FIG. 13 is a schematic perspective view of a coil conductive part used in the light source integrated camera module according to a fourth exemplary embodiment of the present disclosure.

FIG. 12 is a schematic perspective view of a light source integrated module according to a fourth exemplary embodiment of the present disclosure; and FIG. 13 is a schematic perspective view of a coil conductive part used in the light source integrated module according to a fourth exemplary embodiment of the present disclosure.

Referring to FIG. 12, the lens housing may include a light source integrated module 80 disposed in the opening part 222 of the frame 2 formed of the metal. In the light source integrated module 80, the camera module 4 and the light source part 242 may be configured as a single component. Although the camera module 4 and the light source part 242 are attached to, and integrated with, each other in the present exemplary embodiment, they may also be integrated with each other without being attached to each other.

The antenna module 5 including a magnetic material sheet 56 and the flexible substrate 54 may be attached to the light source integrated module 80, as illustrated in FIG. 13.

In addition, the coil conductive part may be wound and formed around a module case 62 of the light source integrated module 80 in the optical axis direction, as illustrated in FIG. 13. Here, the module case 62 of the light source integrated module 80 may include a magnetic material to implement an NFC module appropriate for near field communications.

Figure 14:
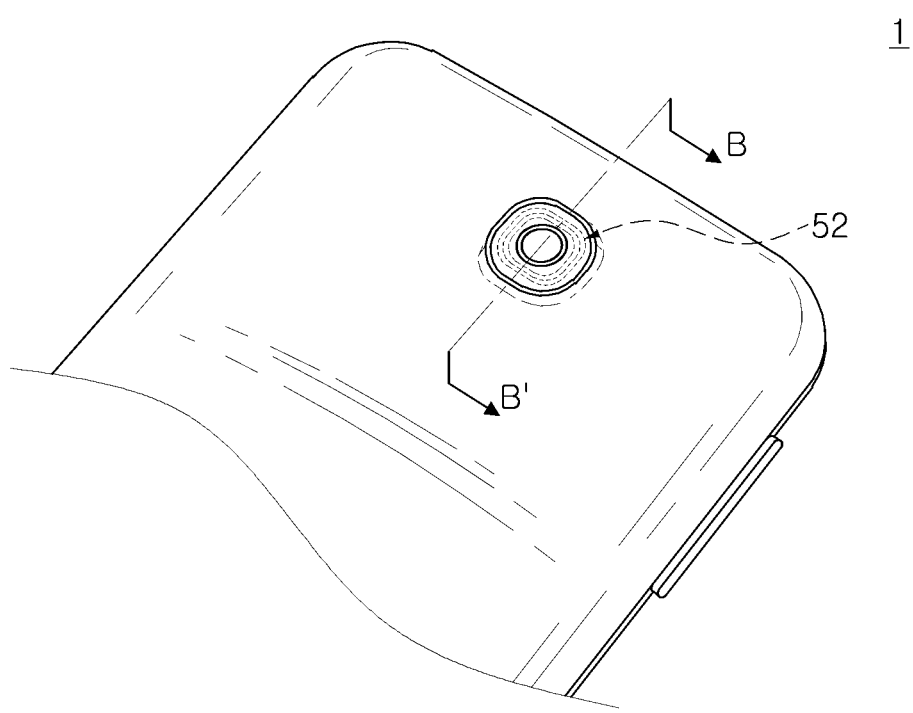
FIG. 14 is a schematic perspective view of an electronic device in which a camera module according to a fifth exemplary embodiment of the present disclosure is used.
Figure 15:
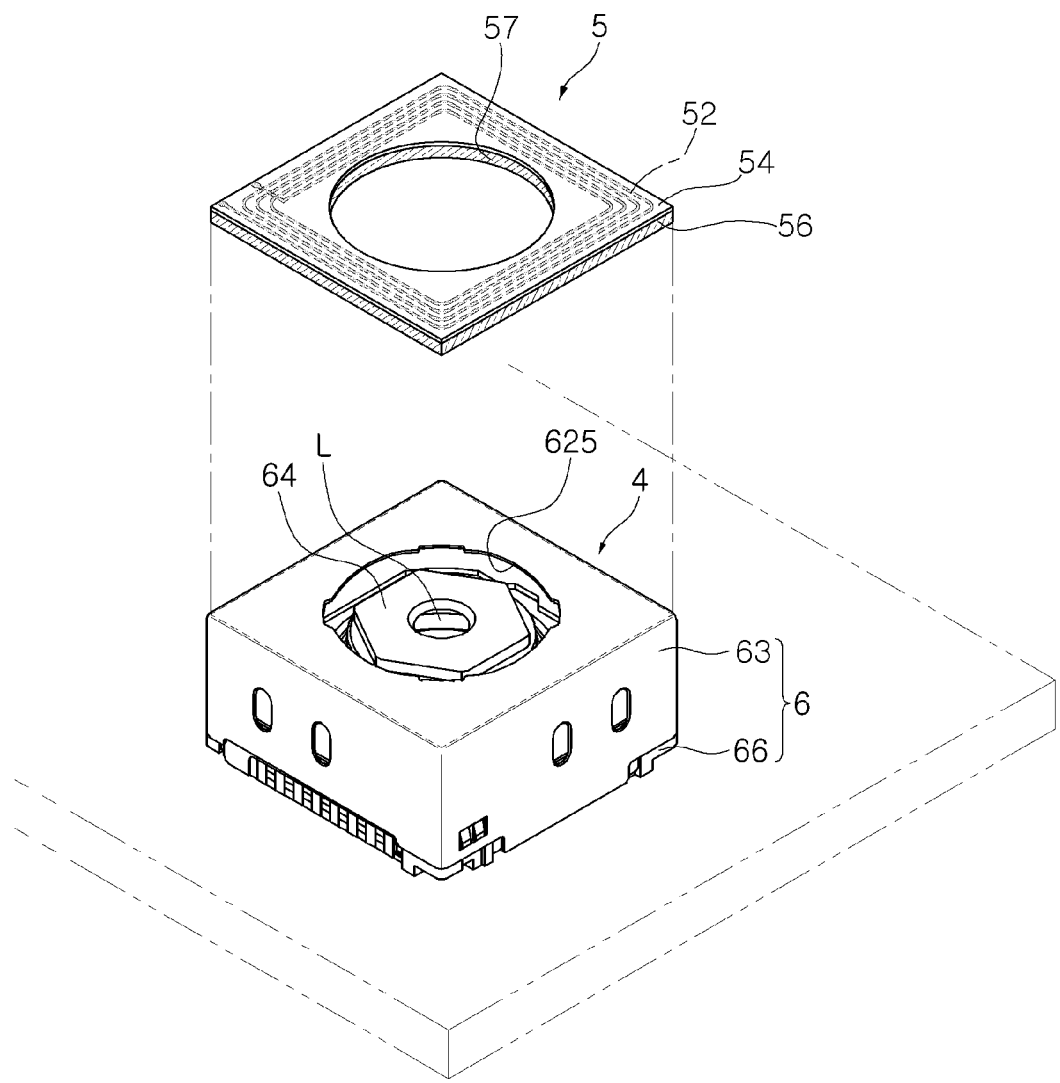
FIG. 15 is a schematic perspective view of a camera module according to a fifth exemplary embodiment of the present disclosure.
Figure 16:
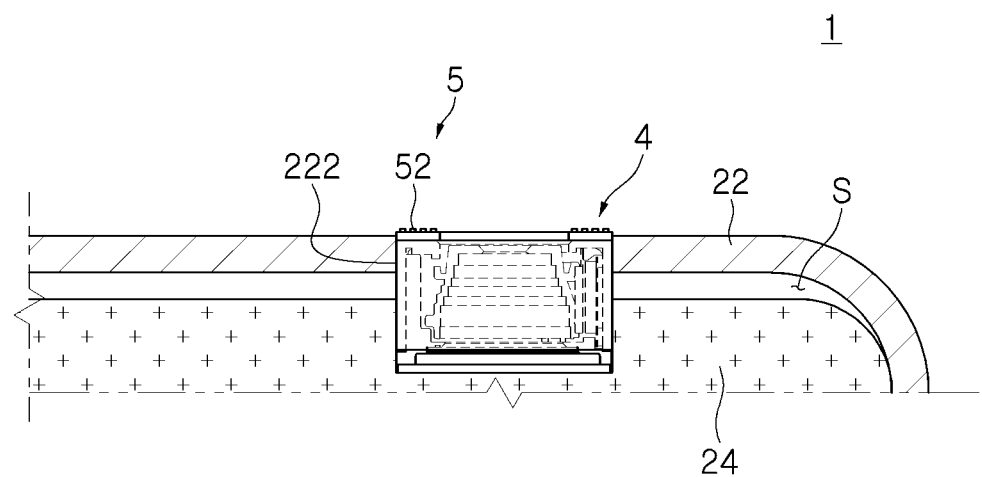
FIG. 16 is a cross-sectional view taken along line B-B' of FIG. 14.

FIG. 14 is a schematic perspective view an electronic device in which a camera module according to a fifth exemplary embodiment of the present disclosure is used; FIG. 15 is a schematic perspective view of a camera module according to a fifth exemplary embodiment of the present disclosure; and FIG. 16 is a cross-sectional view taken along line B-B' of FIG. 14.

Referring to FIGS. 14 and 15, the electronic device may include a module case 62 coupled to a lens housing 66 and in which a penetration hole 625 is formed so that the lens is exposed to light. Here, the module case 62 may be a shield can for shielding electromagnetic waves.

The module case 62 may have the antenna module 5 installed on an upper surface thereof, wherein the antenna module 5 includes the coil conductive part 52 formed outside the penetration hole 625 and transmitting or receiving signals.

The coil conductive part 52 may be formed outside of a substrate hole 57 on one surface of the flexible substrate in which the substrate hole 57 corresponding to the penetration hole 625 is formed, and the magnetic material sheet 56 may be formed on the other surface of the flexible substrate 54.

The electronic device according to the present exemplary embodiment will be again described with reference to FIGS. 14 through 16.

The camera module 4 may contact the opening part 222 of the external frame 22 formed of the metal to close the opening part 222. That is, the camera module 4 may be formed to block a space formed by the opening part 222 from contacting an internal space S of the external frame 22.

In addition, the coil conductive part 52 may be exposed to the outside of the opening part 222 so as to first contact other communications mechanisms as compared with the opening part 222. A structure of the electronic device may be applied to the present exemplary embodiment and other camera modules or electronic component modules.

As set forth above, with the camera module and the electronic device including the same according to an exemplary embodiment of the present disclosure, an unnecessary opening part such as a slit may be omitted from a metal case, such that there may be increased flexibility in designing an external case.

In addition, the coil conductive part is disposed in the opening part, whereby wireless communications may be enabled even though a radius of the coil conductive part is decreased.

Further, the housing of the camera module is implemented using the magnetic material, whereby NFC performance may be improved.

While exemplary embodiments have been shown and described above, it will be apparent to those skilled in the art that modifications and variations could be made without departing from the spirit and scope of the present disclosure as defined by the appended claims.

What is claimed is:

1. A camera module comprising:
 a lens housing in which a lens is disposed;
 a glass cover formed of a transparent material and covering the lens housing; and
 a substrate having a coil conductive part thereon disposed between an outer surface of the lens and an inner surface of the glass cover,
 wherein the coil conductive part is disposed on the substrate and is wound outside of a non-conductive region of the substrate, the non-conductive region having a penetration hole therein in order to expose the lens.

2. The camera module of claim 1, wherein the glass cover has a shielding coating layer formed thereabove in order to prevent the coil conductive part from being exposed externally.

3. The camera module of claim 1, wherein the coil conductive part is injection-molded and enclosed by the glass cover.

4. The camera module of claim 1, wherein the lens housing has a seating groove formed in an edge thereof so that the coil conductive part is seated thereon.

5. The camera module of claim 4, wherein the coil conductive part is formed on the substrate in which the penetration hole is disposed, the penetration hole having a protruding part penetrating therethrough and the protruding part being formed by the seating groove.

6. The camera module of claim 1, wherein the lens housing includes a magnetic material.

7. The camera module of claim 1, wherein the lens housing has a shoulder part protruding therefrom in a direction perpendicular with respect to an optical axis direction, and
 the coil conductive part is formed on an upper surface or a lower surface of the shoulder part.

8. The camera module of claim 1, wherein the coil conductive part is wound and formed in an optical axis direction of the lens housing.

9. The camera module of claim 8, wherein the lens housing around which the coil conductive part is wound includes a magnetic material.

10. The camera module of claim 1, wherein the lens housing includes a light source integrated module formed integrally with a light source part.

11. The camera module of claim 10, wherein the coil conductive part is attached to the light source integrated module.

12. The camera module of claim 10, wherein the coil conductive part is wound around the light source integrated module in an optical axis direction.

13. A camera module comprising:
a lens housing including a lens;
a camera module case coupled to the lens housing and in which a penetration hole is formed so that the lens is exposed to light; and
a coil conductive part disposed outside the penetration hole on an upper surface of the camera module case and transmitting or receiving signals.

14. The camera module of claim 13, further comprising a magnetic material sheet formed on one surface of a flexible substrate, wherein the coil conductive part is formed outside of a substrate hole on another surface of the flexible substrate in which the substrate hole corresponding to the penetration hole is formed.

15. The camera module of claim 13, wherein the lens housing includes a light source integrated module formed integrally with a light source part.

16. An electronic device comprising:
a frame in which an opening part is formed; and
the camera module of claim 1 disposed in the opening part when viewed from a plane and including an image sensor and the substrate that is separate from the image sensor and has thereon the coil conductive part transmitting or receiving signals,
wherein the camera module is coupled to the opening part so as to block a space of the opening part from being connected to an internal space of the frame.

17. The electronic device of claim 16, wherein the coil conductive part is exposed to the outside of the opening part.

18. The electronic device of claim 16, wherein the frame includes a metal.

19. The electronic device of claim 16, wherein the camera module includes a light source integrated module formed integrally with a light source part.

* * * * *